(12) United States Patent
Brost et al.

(10) Patent No.: US 10,951,447 B2
(45) Date of Patent: Mar. 16, 2021

(54) DYNAMIC CYCLIC EXTENSION FOR FAST ACCESS TO SUBSCRIBER TERMINALS (G.FAST)

(71) Applicant: AT&T Intellectual Property I, L.P., Atlanta, GA (US)

(72) Inventors: Ronald Brost, San Ramon, CA (US); Rehan Karim, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/288,919

(22) Filed: Feb. 28, 2019

(65) Prior Publication Data

US 2020/0280472 A1 Sep. 3, 2020

(51) Int. Cl.
*H04L 27/26* (2006.01)
*H04L 7/00* (2006.01)
*H04W 24/10* (2009.01)
*H04L 5/00* (2006.01)

(52) U.S. Cl.
CPC ........ *H04L 27/2607* (2013.01); *H04L 7/0016* (2013.01); *H04W 24/10* (2013.01); *H04L 5/0007* (2013.01)

(58) Field of Classification Search
CPC . H04L 27/2607; H04L 7/0016; H04L 5/0007; H04W 24/10
See application file for complete search history.

(56) References Cited

U.S. PATENT DOCUMENTS

| 6,842,487 | B1 | 1/2005 | Larsson |
| 8,009,747 | B2 | 8/2011 | Song |
| 8,149,685 | B2 | 4/2012 | Yucek et al. |
| 9,100,091 | B2 | 8/2015 | Chang et al. |
| 9,614,582 | B2 | 4/2017 | Chang et al. |
| 9,780,915 | B2 | 10/2017 | Lorca Hernando |
| 1,006,953 | A1 | 9/2018 | Strobel et al. |
| 2008/0273580 | A1* | 11/2008 | Sundstrom ............ H04L 1/0007 375/219 |
| 2015/0326305 | A1 | 11/2015 | Chang et al. |

(Continued)

OTHER PUBLICATIONS

Shah et al., "Effects of Cyclic prefix on OFDM system," Proceedings of the International Conference and Workshop on Emerging Trends in Technology, Feb. 26-27, 2010, ACM 2010.

(Continued)

*Primary Examiner* — Kibrom T Hailu
(74) *Attorney, Agent, or Firm* — Hartman & Citrin LLC

(57) ABSTRACT

Concepts and technologies for dynamic cyclic extension ("CE") for Fast Access to Subscriber Terminals ("G.Fast") are described. According to one aspect described herein, a system can synchronize a G.Fast modem with the default CE value, measure an upstream signal attenuation of a G.Fast cable in a G.Fast circuit to obtain an upstream signal attenuation value, determine a new CE value based upon the upstream signal attenuation value, and determine if the new CE value is not equal to a default CE value. In response to determining that the new CE value is not equal to the default CE value, the system can update and apply a CE value for the G.Fast cable in the G.Fast circuit to the new CE value. If, however, the new CE value is equal to the default CE value, the system can instead apply the default CE value.

20 Claims, 8 Drawing Sheets

(56) References Cited

U.S. PATENT DOCUMENTS

2016/0294441 A1* 10/2016 Fazlollahi ................ H04B 3/36
2019/0044813 A1*  2/2019 Oksman ............. H04L 41/0896
2019/0116059 A1*  4/2019 Linney .................. H04M 3/306

OTHER PUBLICATIONS

Amasa, Ravitej, "Inter Carrier Interference Cancellation in OFDM Systems," Thesis, May 28, 2009.

* cited by examiner

DYNAMIC CYCLIC EXTENSION FOR FAST ACCESS TO SUBSCRIBER TERMINALS (G.FAST)

BACKGROUND

In recent years, the telecommunications industry has focused primarily on mobile broadband technologies, such as Long-Term Evolution ("LTE"), LTE-Advanced ("LTE-A"), and, more recently, $5^{th}$ generation ("5G") technologies. Fixed broadband, however, still offers many advantages over mobile broadband, including overall reliability, speed, and cost. Currently, the state-of-the-art for fixed broadband service utilizes a fiber-to-the-home/building ("FTTH/B") infrastructure to provide fixed broadband services to customers' homes and buildings. However, the implementation of FTTH/B network-wide is met with many financial, regulatory, and strategic burdens. Rather than implement FTTH/B throughout the network, some service providers are exploring ways to improve upon the existing infrastructure and hardware currently deployed, such as using existing copper telecommunications cables with new broadband access standards.

Service providers can improve their fixed broadband networks by implementing Fast Access to Subscriber Terminals ("G.Fast"). G.Fast is a broadband access standard for local loops shorter than 500 meters, and provides up to 2 gigabits per second dedicated per customer, depending on the loop length. G.Fast has been standardized in reference specifications provided by the International Telecommunication Union ("ITU") Telecommunications Standardization Sector ("ITU-T"), the European Telecommunications Standards Institute ("ETSI"), and the Broadband Forum.

G.Fast utilizes a parameter called cyclic extension ("CE"). The required value for CE depends on the cable length used in a given G.Fast circuit. If the CE is too small, inter-symbol interference ("ISI") may result. ISI is a type of distortion of a signal in which one symbol interferes with subsequent symbols. ISI can cause errors during data transmission. If the CE is larger than necessary, unneeded overhead is added. A technician must know in advance the cable length for a given installation to obtain a correct value for the CE. The cable length can be measured manually by the technician, but this is very time-consuming. For this reason, many service providers choose to instead set a maximum value for the CE to account for any possible cable length. This yields a less data efficient implementation of G.Fast that can affect the end user's experience.

SUMMARY

Concepts and technologies disclosed herein are directed to aspects of dynamic cyclic extension ("CE") for Fast Access to Subscriber Terminals ("G.Fast"). According to one aspect disclosed herein, a system can include a processor and a memory. The memory can have instructions stored thereon that, when executed by the processor, cause the processor to perform operations. In particular, the system can execute the instructions via the processor to synchronize a G.Fast modem, such as located at customer premises, with a default CE value, to measure an upstream signal attenuation of a G.Fast cable in a G.Fast circuit to obtain an upstream signal attenuation value, to determine a new CE value based upon the upstream signal attenuation value, and to determine if the new CE value is not equal to a default CE value. In response to determining that the new CE value is not equal to the default CE value, the system can update a CE value for the G.Fast cable in the G.Fast circuit to the new CE value.

In some embodiments, the system can measure the upstream signal attenuation of the G.Fast cable in the G.Fast circuit to obtain the upstream signal attenuation value in accordance with a standard. For example, the ITU specifies a method for measuring the upstream signal attenuation of a G.Fast cable.

In some embodiments, the system can determine the new CE value based upon the upstream signal attenuation value by using a cross-reference table to determine the new CE that cross references the upstream signal attenuation value. The CE is used in G.Fast to provide a guard interval between adjacent symbols, thereby protecting against ISI. ITU G.997.2 section 7.1.1.3 defines the CE as the cyclic prefix ($L_{cp}$), with dimensions of N/64 samples, where N is the index of the highest supported data-bearing subcarrier. The CE is determined by setting $L_{cp}$. The numerical value provided by the operator is the value m, which is obtained from the cross-reference table based upon a cross reference of the upstream signal attenuation value. The CE can then be determined from the equation: $L_{cp}=m*N/64$, as provided in ITU G.9701 section 10.4.4.

In response to determining that the new CE value is equal to the default CE value, the system can apply the default CE value. Application of the CE value assigns the value to the appropriate port that is in connection with the analyzed G.Fast cable. Alternatively, in response to determining that the new cyclic extension value is not equal to the default CE value, the system can instead apply the new CE value.

In some embodiments, the processor and the memory of the system are implemented, at least in part, in a G.Fast distribution point unit ("DPU"). In some other embodiments, the processor and the memory of the system are implemented, at least in part, in a component of a software-defined network ("SDN"), such as an SDN controller.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

DETAILED DESCRIPTION

The concepts and technologies disclosed herein are directed to dynamic cyclic extension ("CE") for Fast Access to Subscriber Terminals ("G.Fast"). Currently, G.Fast circuits require a technician to measure the length of cable needed between a distribution point unit ("DPU") and customer premises equipment ("CPE"). The optimum CE value can be selected based upon the measured length of the cable. Alternatively, the CE value can be selected based upon a maximum cable length. This practice is likely to yield a longer cable length than necessary. If the cable length estimate is conservatively long, the G.Fast circuit is likely to waste bandwidth that otherwise could be used by a payload. If the cable length estimate is too short, the G.Fast circuit risks inter-symbol interference ("ISI"). Currently, there is no way to automatically determine the optimum CE length without manual intervention.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
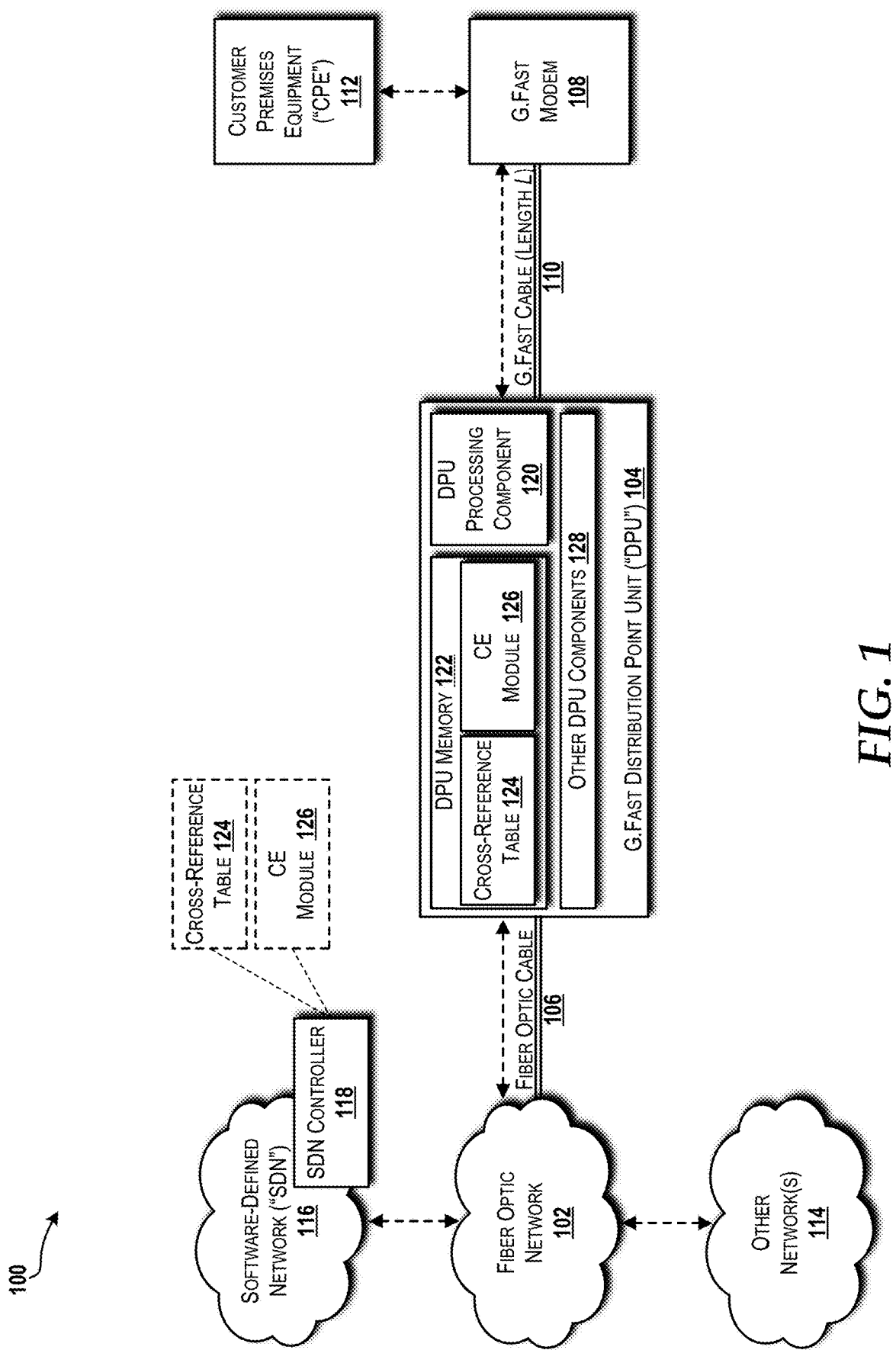
FIG. 1 is a block diagram illustrating aspects of an illustrative operating environment for various concepts disclosed herein.

Turning now to FIG. 1, an operating environment 100 in which embodiments of the concepts and technologies disclosed herein will be described. The illustrated operating environment 100 includes a fiber optic network 102 in communication with a G.Fast distribution point unit ("DPU") 104 via a fiber optic cable 106 that, in turn, is in communication with a G.Fast modem 108 via a G.Fast cable 110. The G.Fast modem 108 allows customer premises equipment ("CPE") 112 to communicate with the fiber optic network 102 via the G.Fast DPU 104. Although only a single fiber optic network 102, G.Fast DPU 104, fiber optic cable 106, G.Fast modem 108, G.Fast cable 110, and CPE 112 are shown in the illustrated embodiment, those skilled in the art will appreciate implementations that include two or more of any of these elements. For example, the fiber optic network 102 might communicate with multiple G.Fast DPUs 104 via multiple fiber optic cables 106, and each of the G.Fast DPUs 104 might, in turn, communicate with one or more G. Fast modems 108 that each allows one or more CPE 112 to communicate back to the fiber optic network 102 via the G.Fast DPU(s) 104.

The fiber optic network 102 uses fiber optic cables, such as the fiber optic cable 106, to transmit data between systems, devices, nodes, sub-networks, the G.Fast DPUs 104, and the like using light as a carrier wave to transmit the data over optical fibers. The fiber optic network 102 can provide a backhaul network for one or more other network(s) 114, which can be or can include one or more telecommunications networks, the Internet, one or more circuit-switched networks, one or more packet networks, combinations thereof, and the like.

The fiber optic network 102 can include any number of sub-networks (not shown). The sub-networks can vary in the number of wavelengths per fiber pair, data rate supported, and/or optical reachability parameters. The sub-networks can be part of a multi-layer network (not shown), wherein the IP traffic of a packet-layer is carried by the underlying optical layer. The fiber optic network 102 can include any number of regenerators that are used to convert a signal from an optical signal to an electronic signal, to correct any detected errors, and then to convert the signal back to an optical signal with a better optical signal-to-noise ratio. The configuration of the regenerators can be selected based upon the needs of a given implementation. In some embodiments, the fiber optic network 102 can utilize one or more reconfigurable-optical-add-drop multiplexers ("ROADMs"), so that fewer regenerators are needed in the fiber optic network 102. The ROADMs (not shown) can be implemented, at least in part, via a software-defined network ("SDN") 116. The ROADMs, in some embodiments, are colorless and directionless, also known as CD-ROADMs. The fiber optic network 102 can be configured in numerous ways to meet the needs of different use cases. As such, additional details about the architecture of the fiber optic network 102 are not disclosed herein. It should be understood, however, that, in addition to traditional hardware-based network architectures, the fiber optic network 102 can be, can include, or can operate in communication with the SDN 116 that is controlled by one or more SDN controllers 118. Some operations disclosed herein can be performed by the G.Fast DPU 104, the SDN controller 118, or both, as will be described in greater detail herein below.

In some embodiments, the SDN controller 118 is implemented as a standalone system that includes a combination of hardware and software components that work together to provide the functionality described herein. In other embodiments, the SDN controller 118 is implemented in a physically distributed way, such as via a cloud computing environment (best shown in FIG. 7 and described herein below with reference thereto). Those skilled in the art will appreciate the numerous designs and deployment scenarios that can be used to implement the SDN controller 118 in a real-world network.

The fiber optic network 102 is described herein as using orthogonal frequency division multiplexing ("OFDM") as the modulation technique. The concepts and technologies disclosed herein are described based upon OFDM. It should be understood, however, that the fiber optic network 102 can use alternative or additional modulation techniques for other optical communications. As such, the fiber optic network 102 is not limited to the use of OFDM as the modulation technique, although some aspects of the concepts and technologies disclosed herein might be applicable only to OFDM.

The G.Fast DPU 104 is a node that resides at a distribution point where telecommunications cables (e.g., traditional copper cables) from a central office connect to the final copper cable drops into customers' premises (e.g., home or building), such as where the G.Fast modem 108 is located. The illustrated example provides a simplified architecture in which the G.Fast DPU 104 is shown in direct communication with the fiber optic network 102 via the fiber optic cable 106. Those skilled in the art will appreciate additional nodes, central offices, fiber optic cables, other telecommunications equipment, and the like can be implemented between the fiber optic network 102 and the G.Fast DPU 104. As such, the illustrated example is used merely for ease of explanation and should not be considered limiting in any way.

The G.Fast DPU 104 can be designed in accordance with reference specifications provided by the International Telecommunication Union ("ITU") Telecommunications Standardization Sector ("ITU-T"), the European Telecommunications Standards Institute ("ETSI"), and the Broadband Forum. Those skilled in the art will appreciate that the specific design of the G.Fast DPU 104 is ultimately a decision made by the service provider or other entity responsible for deployment of the G.Fast DPU 104. The G.Fast DPU 104 can be an off-the-shelf unit available from a vendor or a custom-designed unit.

The illustrated G.Fast DPU 104 is shown having an exemplary architecture that includes a DPU processing component 120, a DPU memory 122 having stored thereon a cross-reference table 124 and a CE module 126, and other DPU components 128. The G.Fast DPU 104 can be designed as a system-on-a-chip ("SoC") that includes the DPU processing component 120, the DPU memory 122, and the other DPU components 128. The G.Fast DPU 104 alternatively can include any of the aforementioned components as stand-alone components. The other DPU components 128 can be, for example, one or more optical receivers, one or more optical transmitters, one or more optical transceivers, one or more G.Fast switches (e.g., g.999.1), one or more digital front-ends ("DFEs"), one or more analog front-ends ("AFEs"), other DPU chipsets, and the like. Those skilled in the art will appreciate the design of the G.Fast DPU 104 can be selected to accommodate a particular deployment of the G.Fast DPU 104, and as such, a specific design is not described further herein.

The DPU processing component 120 can be a single core or multi-core processor or combination of multiple processors to process data, to execute computer-executable instructions, such as those in the CE module 126, and to communicate with the DPU memory 122 and the other DPU components 128 to perform various functionality described herein. The DPU memory 122 can include random access memory ("RAM"), read-only memory ("ROM"), integrated storage memory, removable storage memory, or any combination thereof. The DPU memory 122 can be solid state, mechanical hard disk, or a hybrid thereof. The DPU memory 122 is not limited to any particular memory technology.

As explained above, one of the parameters to be configured for G.Fast deployments is the CE. The CE value depends on cable length. In the illustrated example, the CE value can be selected based upon the measured attenuation of the G.Fast cable 110 having length L. If the CE is too small, ISI can result. If the CE is larger than necessary, unneeded overhead is added. In accordance with the concepts and technologies disclosed herein, the CE module 126 can be executed by the DPU processing component 120 to select the CE value for a given G.Fast circuit based upon a measured attenuation of the G.Fast cable (length L) 110, and can automatically apply the selected CE value. In this manner, ISI is avoided, user data throughput is not unnecessarily wasted, and a technician is no longer needed to measure the G.Fast cable 110 in advance.

Figure 2:
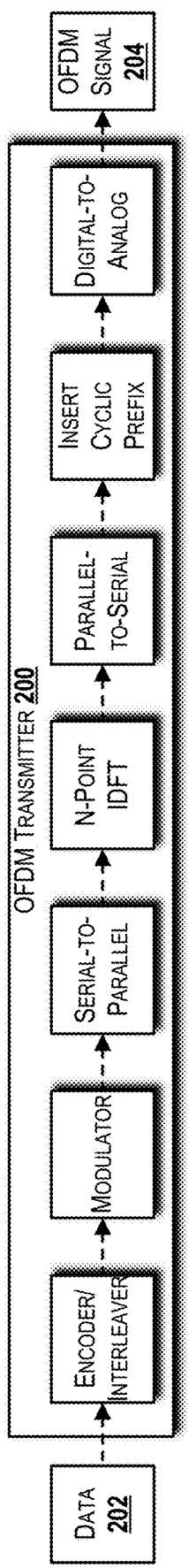
FIG. 2 is a block diagram illustrating aspects of an orthogonal frequency-division multiplexing ("OFDM") transmitter and components thereof that can be used to implement various concepts disclosed herein.
Figure 3:
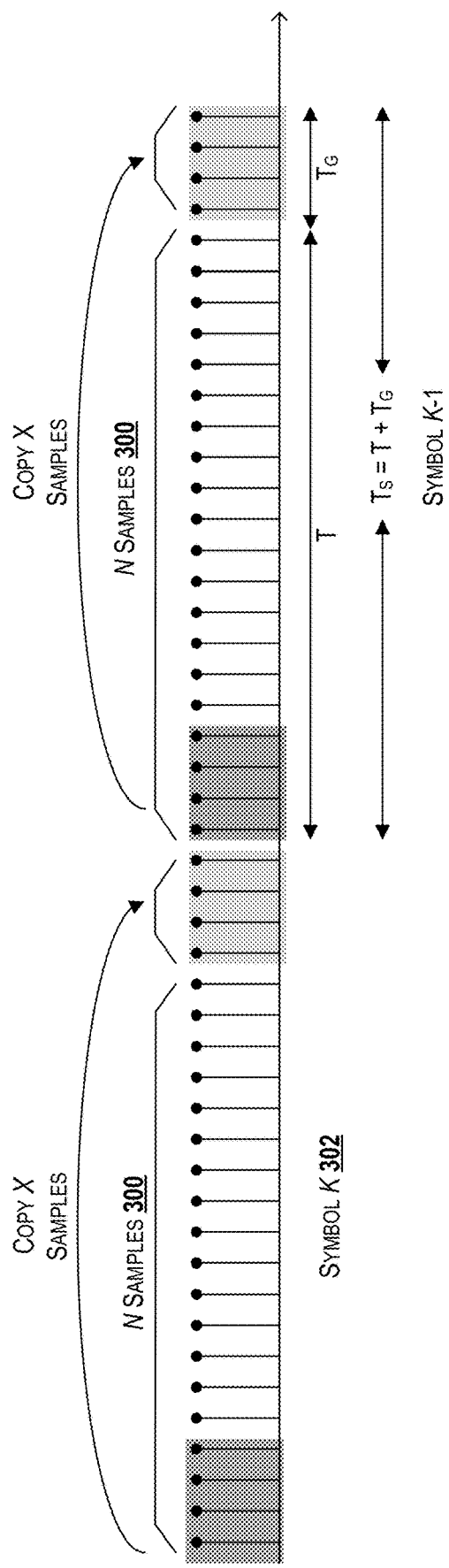
FIG. 3 is a diagram illustrating aspects of guard band creation for the prevention of inter-symbol interference ("ISI") in relation to concepts disclosed herein.

Turning briefly to FIGS. 2 and 3, a general description of CE is now provided to aid in understanding the novelty and benefits of the concepts and technologies disclosed herein. In FIG. 2, an OFDM transmitter 200 is illustrated as receiving data 202 as input, processing the data 202 through various functions, including an encoder/interleaver, a serial-to-parallel converter, an N-point inverse discrete Fourier transform ("IDFT"), a parallel-to-serial converter, a cyclic prefix inserter, and a digital-to-analog converter, and then outputting an OFDM signal 204. The various functions mentioned above are well-known in the art and are not described in further detail herein except for the insert cyclic prefix function, which inserts the CE value selected in accordance with the concepts and technologies disclosed herein.

The OFDM transmitter 200 uses mutually orthogonal subcarriers to transmit the data 202 in a spectrally efficient way. The OFDM signal 204 output by the OFDM transmitter 200 includes modulated digital symbols in the time domain. The non-ideal characteristics of a transmission channel will cause ISI between adjacent OFDM symbols. To prevent ISI, guard bands are used in between the tones in the frequency domain. Creation of the guard bands is accomplished by copying a portion of the time-domain signal and applying that copied portion to the end of the time domain signal. The copied part of the time-domain signal is the CE. The CE of the OFDM signal 204 is the periodic extension of the IDFT output. An example of this is illustrated in FIG. 3. FIG. 3 shows some number of discrete time-domain samples 300 copied from the beginning of a symbol K 302 and added to the end of the symbol K 302. In the time domain, the total symbol time is the time of the original symbol plus the time of the copied and added portion of the symbol. An advantage of this is to overcome ISI. The drawbacks can include increased energy used to transmit the CE and a reduced user data transmission rate.

The CE is used in G.Fast to provide a guard interval between adjacent symbols, thereby protecting against ISI. ITU G.997.2 section 7.1.1.3 defines the CE as the cyclic prefix ($L_{cp}$), with dimensions of N/64 samples, where N is the index of the highest supported data-bearing subcarrier. The CE is determined by setting $L_{cp}$. The numerical value provided by the operator is the value m, where $L_{cp}=m*N/64$ (Equation 1), as provided in ITU G.9701 section 10.4.4.

As mentioned above, a problem with current CE selection is that a technician must know the length of the G.Fast cable 110 in advance to select the optimum CE. Alternatively, the technician could select a CE that corresponds to the maximum cable length that could be encountered. These solutions are not optimal because choosing a CE longer than necessary wastes user data throughput and electrical power. If the cable length estimate is conservatively long, bandwidth that could otherwise be used by the payload is wasted. If the cable length estimate is too short, the G.Fast deployment risks ISI. Yet another way to address this problem is to measure the exact length of the cable and choose a CE length based upon the exact length. While accurate, this requires the technician to measure the G.Fast cable 110, and the measurement has to be applied to the G.Fast network in the form of a chosen CE. Many service providers opt to set the CE for the maximum expected cable length, but this ultimately yields cable lengths that are too long, which avoids ISI at the expense of wasting data throughput and electrical power.

The concepts and technologies provide a novel and nonobvious solution to the aforementioned problems by automatically selecting the optimum CE value (i.e., the CE value that avoids both ISI and wasted data throughput and electrical power) without manual intervention by a technician. In summary, the CE is one of the configuration parameters of a G.Fast circuit. Longer cables require a larger CE value to avoid ISI. It is desired to adjust the CE to a smaller value for shorter cables, since the ISI requirement is less stringent, and a larger CE uses up some of the bandwidth. This additional overhead takes bandwidth away from the end user. Although it is not necessary to have the CE length infinitely adjustable, several different CE lengths are made available.

In accordance with the concepts and technologies disclosed herein, a system can create a G.Fast circuit with default CE value that is the highest possible CE value. Then, after the system measures the signal attenuation for the cables used in the G.Fast circuit, the signal attenuation can be used to look up the cable length based on known cross references to cable length, such as stored in the cross-reference table 124, and to determine what the optimal CE value should be. The system can automatically change the CE value to the optimal value. By automatically setting the optimal CE value, more bandwidth is available to the end user because bandwidth is not used to transmit a longer than necessary CE. This is an improvement over the current state of the art because the CE value is optimized without intervention, and without knowing the cable length in advance. This is an innovation in the operation and administration of a service provider's network, in addition to improving performance for the end user.

Returning to FIG. 1, the aforementioned method can be implemented in at least two ways. The DPU 104 can determine and set the CE value, or, in the case of an SDN implementation, the SDN controller 118 can determine and set the CE value. In the former case, the DPU 104 can measure the signal attenuation in accordance with ITU G.9701 Amendment 2 Section 11.4.1. The CE module 126 can include instructions to add the functionality to look up the correct CE value corresponding to the signal attenuation, to check that CE value against the default CE value, and change the CE value if needed. Alternatively, in the SDN case, the DPU 104 knows the signal attenuation value, as before. However, in this case, the signal attenuation value and the default CE value can be sent to the SDN controller 118. The function of determining the required CE value, checking that value against the default CE value, and specifying a change of CE if needed, can be performed by the SDN controller 118 via execution of the instructions in the CE module 126.

Figure 4:
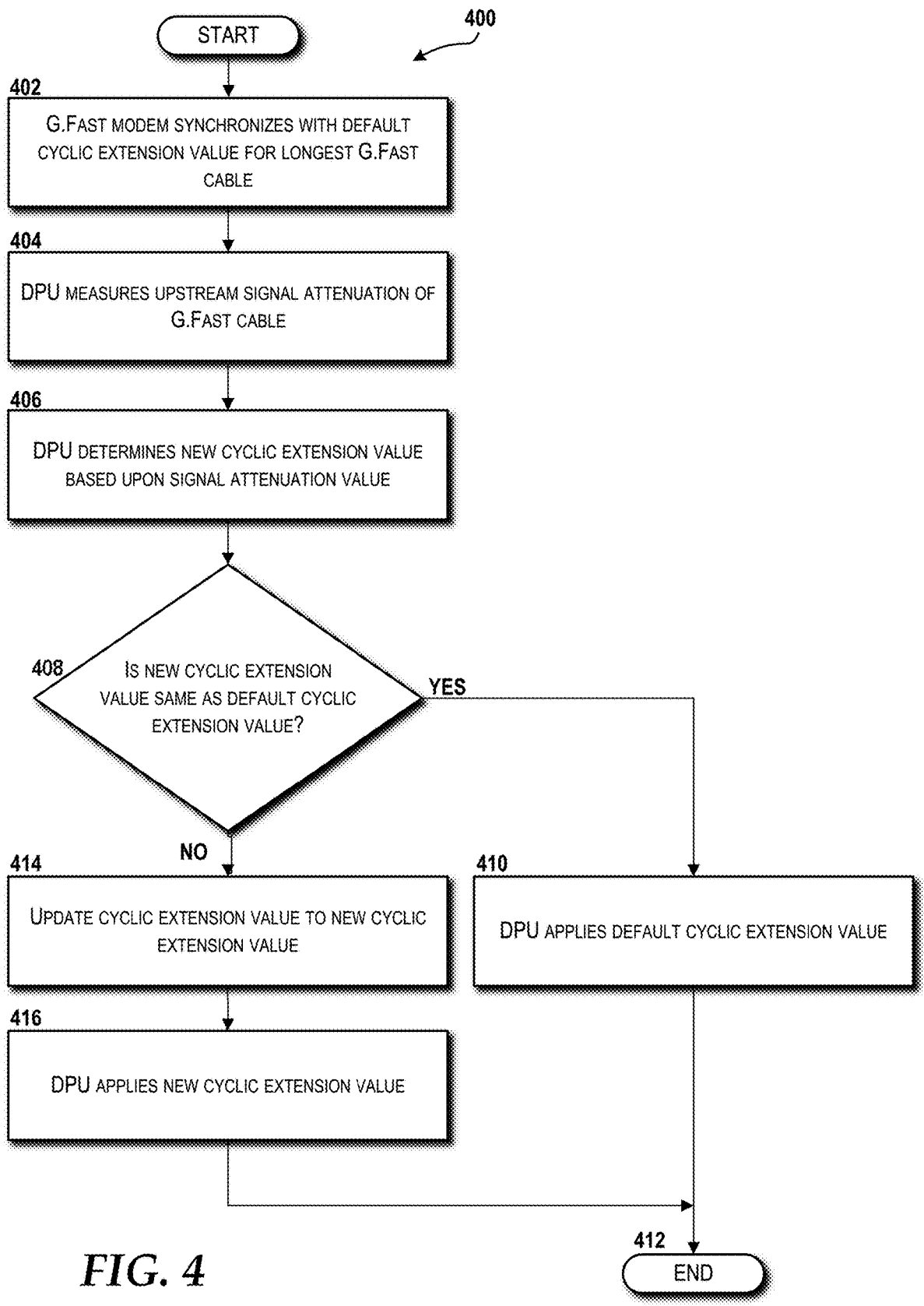
FIG. 4 is a flow diagram illustrating aspects of a method for dynamically determining and applying a G.Fast cyclic extension ("CE") value, according to an illustrative embodiment of the concepts and technologies disclosed herein.

Turning now to FIG. 4, a flow diagram illustrating aspects of a method 400 for dynamically determining and applying a G.Fast CE value will be described, according to an illustrative embodiment. FIG. 4 will be described with additional reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the DPU processing component 120 of the DPU 104 or the SDN controller 118, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described as being performed by the DPU 104 via execution of instructions in the CE module 126, although the operations alternatively can be performed, at least in part, by the SDN controller 118 via execution of a similar CE module 126 instruction set. The method 400 begins and proceeds to operation 402, where the G.Fast modem 108 synchronizes with a default CE value for the longest G.Fast cable that could be encountered in the G.Fast circuit. This value might be the current value used by many service providers—that is, the maximum cable length that could be encountered.

From operation 402, the method 400 proceeds to operation 404, where the DPU 104 measures the upstream signal attenuation of the G.Fast cable 110. The ITU standard specification describes how a DPU, such as the DPU 104, can measure the upstream signal attenuation of a deployed cable. The concepts and technologies can adopt this method, but those skilled in the art should understand that other measurement methods are possible and are contemplated.

From operation 404, the method 400 proceeds to operation 406, where the DPU 104 determines a new CE value based upon the signal attenuation value measured at operation 404. In particular, the DPU 104 can use the cross-reference table 124 to determine the new CE value that cross references the signal attenuation value. Table 1 below is an example of the cross-reference table 124. The minimum and maximum values corresponding to each value of m can be determined by measuring cable in advance of being installed. Table 1 below indicates a way to look up the value of m for ranges of measured signal attenuation. The value of m is then used in Equation 1 ($L_{cp}$=m*N/64) to determine the new CE value.

TABLE 1

| m | Signal Attenuation (dB) | |
|---|---|---|
|   | Min. | Max. |
| 4 | 0 | a |
| 8 | a | b |
| 10 | b | c |
| 12 | c | d |
| 14 | d | e |
| 16 | e | f |
| 20 | f | g |
| 24 | g | h |
| 30 | h | I |
| 33 | i | j |

From operation 406, the method 400 proceeds to operation 408, where the DPU 104 determines if the new CE value is the same as the default CE value. If the new CE value and the default CE value are the same, the method 400 proceeds to operation 410, where the DPU 104 applies the default CE value. The method 400 then proceeds to operation 412, where the method 400 ends. If, however, the new CE value and the default CE value are different, the method 400 instead proceeds from operation 408 to operation 414, where the DPU 104 updates the default CE value to the new CE value. This new CE value is considered the optimal CE value for the analyzed G.Fast circuit. It should be understood, however, that the optimal CE value might be higher or lower depending upon the values available in the table. For example, if the potential values in the table have a higher granularity, the selected CE value might be further optimized over those with a lower granularity, resulting in potentially greater savings in terms of user data throughput and electrical power. From operation 414, the method 400 proceeds to operation 416, where the DPU 104 applies the new CE value to the appropriate DPU port to which the analyzed cable is connected. From operation 416, the method 400 proceeds to operation 412, where the method 400 ends.

The method 400 can be performed at any time. For example, the DPU 104 might be performed prior to deployment of a G.Fast circuit, during deployment of a G.Fast circuit, during maintenance to further optimize the CE value, or at any other time as desired by the service provider. In some embodiments, the DPU 104 can be programmed to perform the method 400 after deployment of a G.Fast circuit as a retrofit solution to free up data throughput and reduce power consumption.

Figure 5:
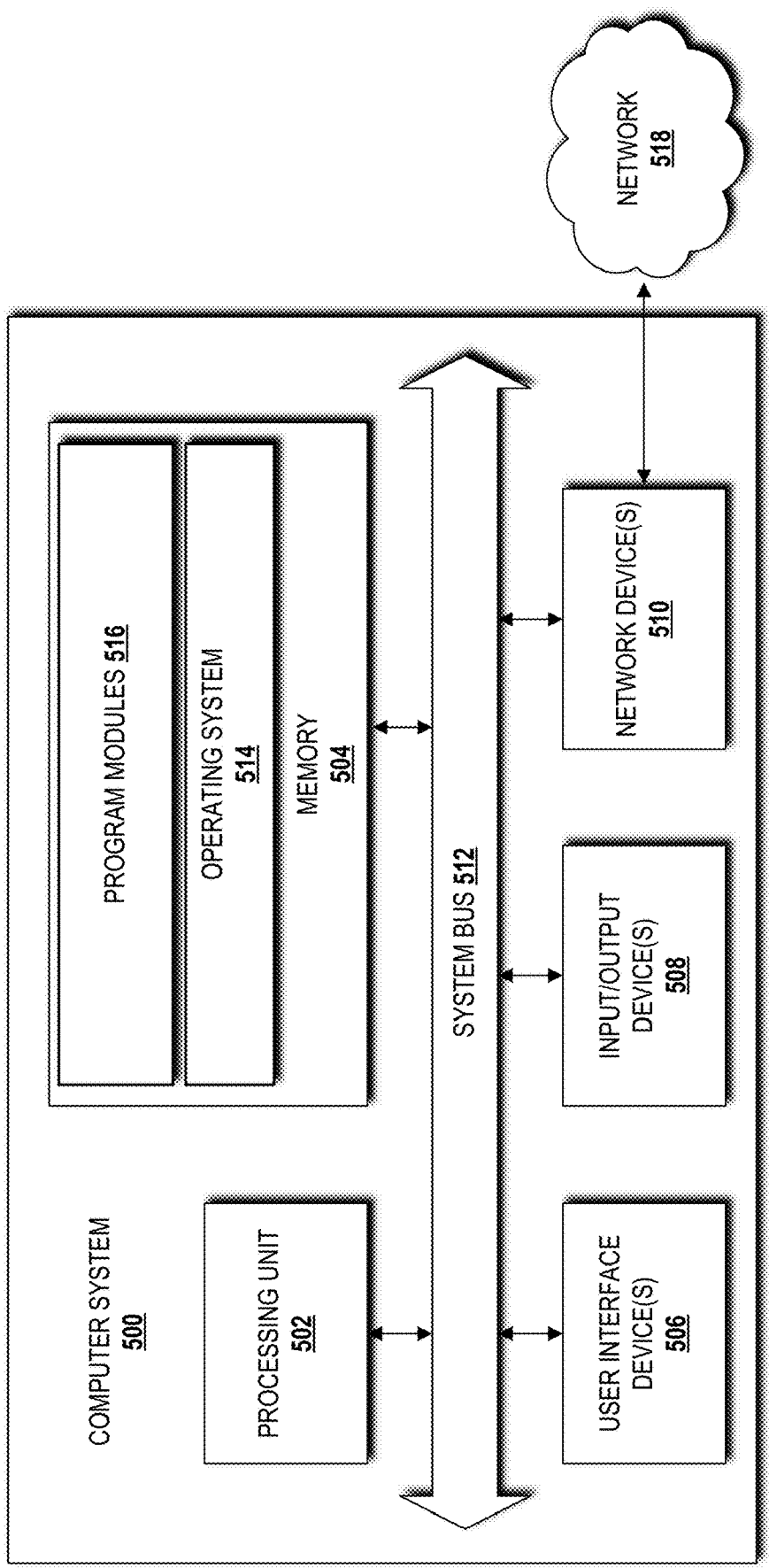
FIG. 5 is a block diagram illustrating an example computer system, according to some illustrative embodiments.

Turning now to FIG. 5, a block diagram illustrating a computer system 500 configured to provide the functionality described herein in accordance with various embodiments of the concepts and technologies disclosed herein. In some embodiments, the CPE 112, and/or other devices/systems can be configured as and/or can have an architecture similar or identical to the computer system 500 described herein with respect to FIG. 5. It should be understood, however, that the CPE 112 may or may not include the functionality described herein with reference to FIG. 5.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer to output data.

The network devices 510 enable the computer system 500 to communicate with other networks or remote systems via one or more networks 518, such as created, at least in part, by the G.Fast modem 108 (e.g., a customer premises network). The network 518 additionally or alternatively can include the fiber optic network 102, the other network(s) 114, the SDN 116, or any combination thereof. Examples of the network devices 510 include, but are not limited to, a modem, a radio frequency ("RF") or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 6:
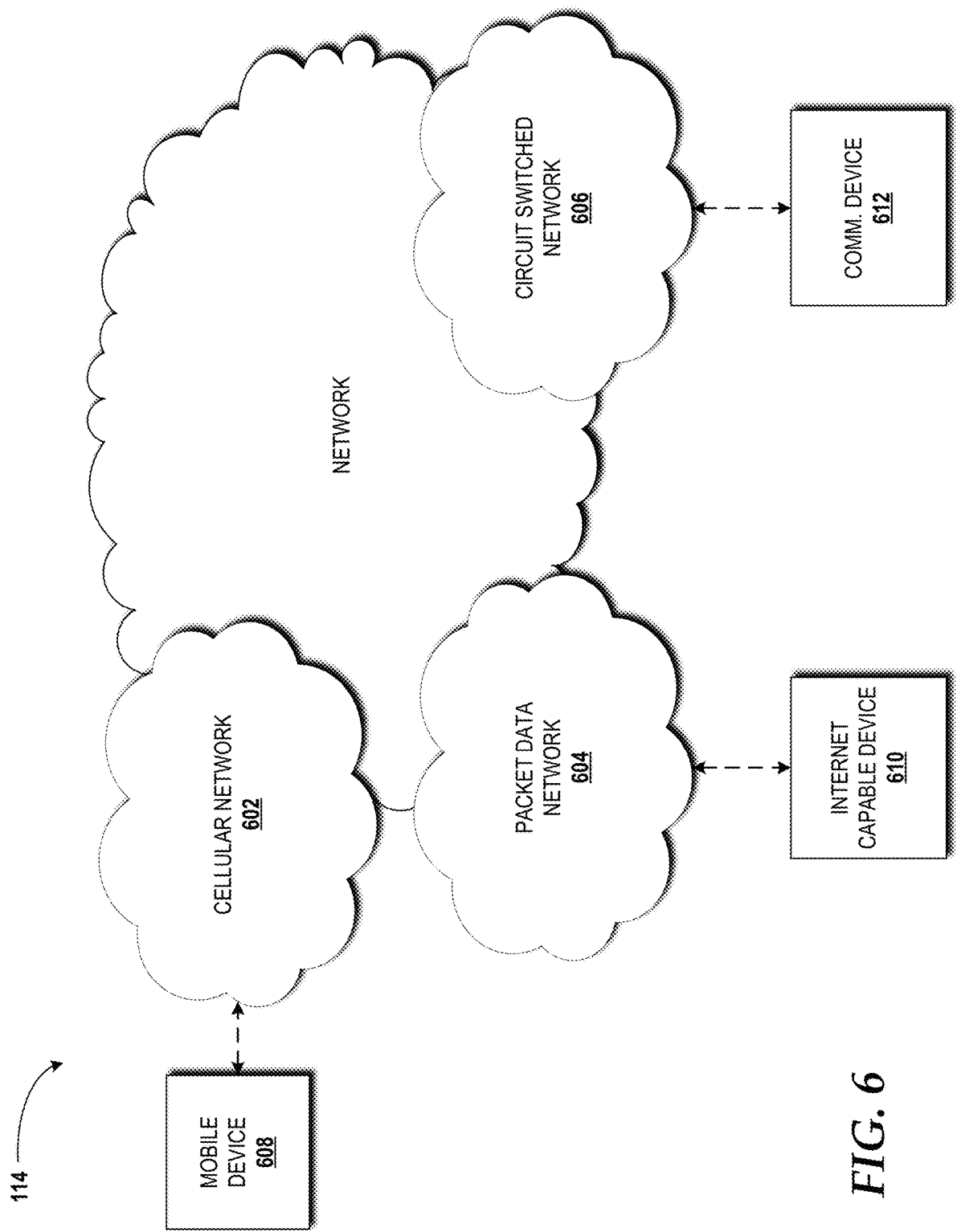
FIG. 6 schematically illustrates a network, according to an illustrative embodiment.

Turning now to FIG. 6, additional details of an embodiment of the other network 114 are illustrated, according to an illustrative embodiment. The other network 114 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a user device, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, a personal computer ("PC"), a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the other network 114 may be used to refer broadly to any combination of the networks 602, 604, 606. It should be appreciated that substantially all of the functionality described with reference to the other network 114 can be performed by the cellular network 602, the packet data network 604, and/or the circuit switched network 606, alone or in combination with other networks, network elements, and the like.

Figure 7:
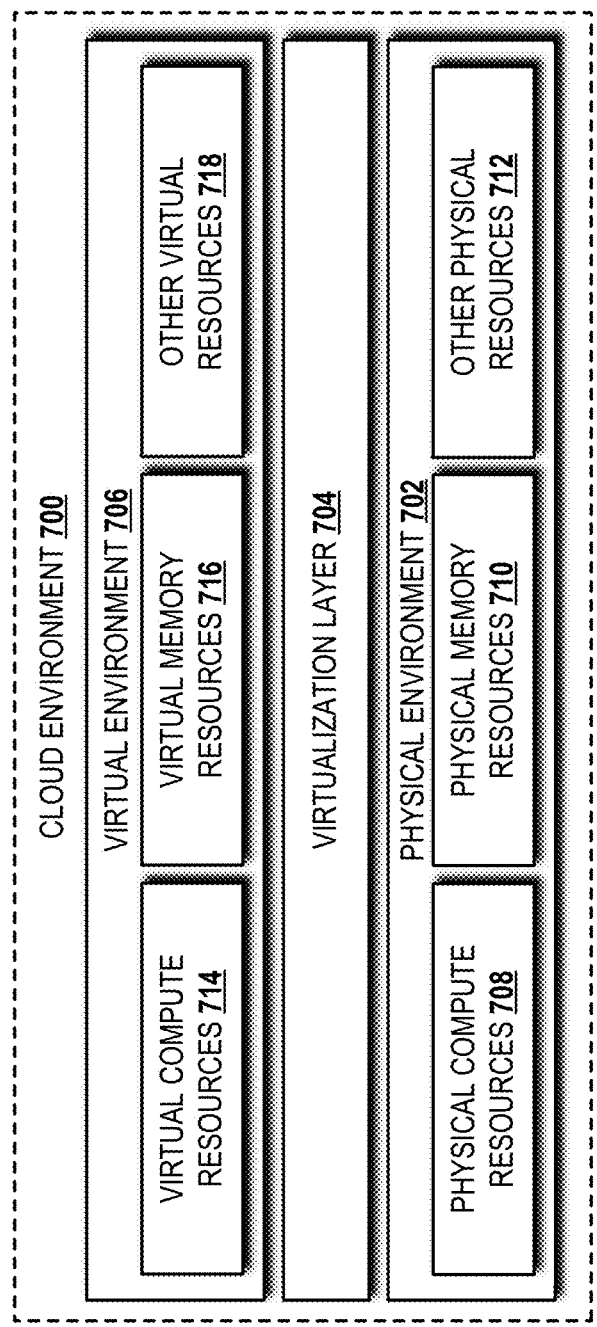
FIG. 7 is a block diagram illustrating aspects of an illustrative cloud environment capable of implementing aspects of the embodiments presented herein.

Turning now to FIG. 7, an illustrative cloud environment 700 will be described, according to an illustrative embodiment. The cloud environment 700 includes a physical environment 702, a virtualization layer 704, and a virtual environment 706. While no connections are shown in FIG. 7, it should be understood that some, none, or all of the components illustrated in FIG. 7 can be configured to interact with one another to carry out various functions described herein. In some embodiments, the components are arranged so as to communicate via one or more networks. Thus, it should be understood that FIG. 7 and the remaining description are intended to provide a general understanding of a suitable environment in which various aspects of the embodiments described herein can be implemented, and should not be construed as being limiting in any way.

The physical environment 702 provides hardware resources, which, in the illustrated embodiment, include one or more physical compute resources 708, one or more physical memory resources 710, and one or more other physical resources 712. The physical compute resource(s)

708 can include one or more hardware components that perform computations to process data and/or to execute computer-executable instructions of one or more application programs, one or more operating systems, and/or other software.

The physical compute resources 708 can include one or more central processing units ("CPUs") configured with one or more processing cores. The physical compute resources 708 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 708 can include one or more discrete GPUs. In some other embodiments, the physical compute resources 708 can include CPU and GPU components that are configured in accordance with a co-processing CPU/GPU computing model, wherein the sequential part of an application executes on the CPU and the computationally-intensive part is accelerated by the GPU processing capabilities. The physical compute resources 708 can include one or more system-on-chip ("SoC") components along with one or more other components, including, for example, one or more of the physical memory resources 710, and/or one or more of the other physical resources 712. In some embodiments, the physical compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 708 can be or can include one or more hardware components architected in accordance with an ARM architecture, available for license from ARM HOLDINGS of Cambridge, United Kingdom. Alternatively, the physical compute resources 708 can be or can include one or more hardware components architected in accordance with an x86 architecture, such an architecture available from INTEL CORPORATION of Mountain View, Calif., and others. Those skilled in the art will appreciate the implementation of the physical compute resources 708 can utilize various computation architectures, and as such, the physical compute resources 708 should not be construed as being limited to any particular computation architecture or combination of computation architectures, including those explicitly disclosed herein.

The physical memory resource(s) 710 can include one or more hardware components that perform storage/memory operations, including temporary or permanent storage operations. In some embodiments, the physical memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 708.

The other physical resource(s) 712 can include any other hardware resources that can be utilized by the physical compute resources(s) 708 and/or the physical memory resource(s) 710 to perform operations described herein. The other physical resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 702 can be virtualized by one or more virtual machine monitors (not shown; also known as "hypervisors") operating within the virtualization/control layer 704 to create virtual resources that reside in the virtual environment 706. The virtual machine monitors can be or can include software, firmware, and/or hardware that alone or in combination with other software, firmware, and/or hardware, creates and manages virtual resources operating within the virtual environment 706.

The virtual resources operating within the virtual environment 706 can include abstractions of at least a portion of the physical compute resources 708 (shown as virtual compute resources 714), the physical memory resources 710 (shown as virtual memory resources 716), and/or the other physical resources 712 (shown as other virtual resources 718), or any combination thereof. In some embodiments, the abstractions can include one or more virtual machines upon which one or more applications can be executed. In some embodiments, one or more components of the SDN 116, the SDN controller 118, the fiber optic network 102, the other network(s) 114, the DPU 104, the G.Fast modem 108, the CPE 112, and/or other elements disclosed herein can be implemented in the virtual environment 706.

Figure 8:
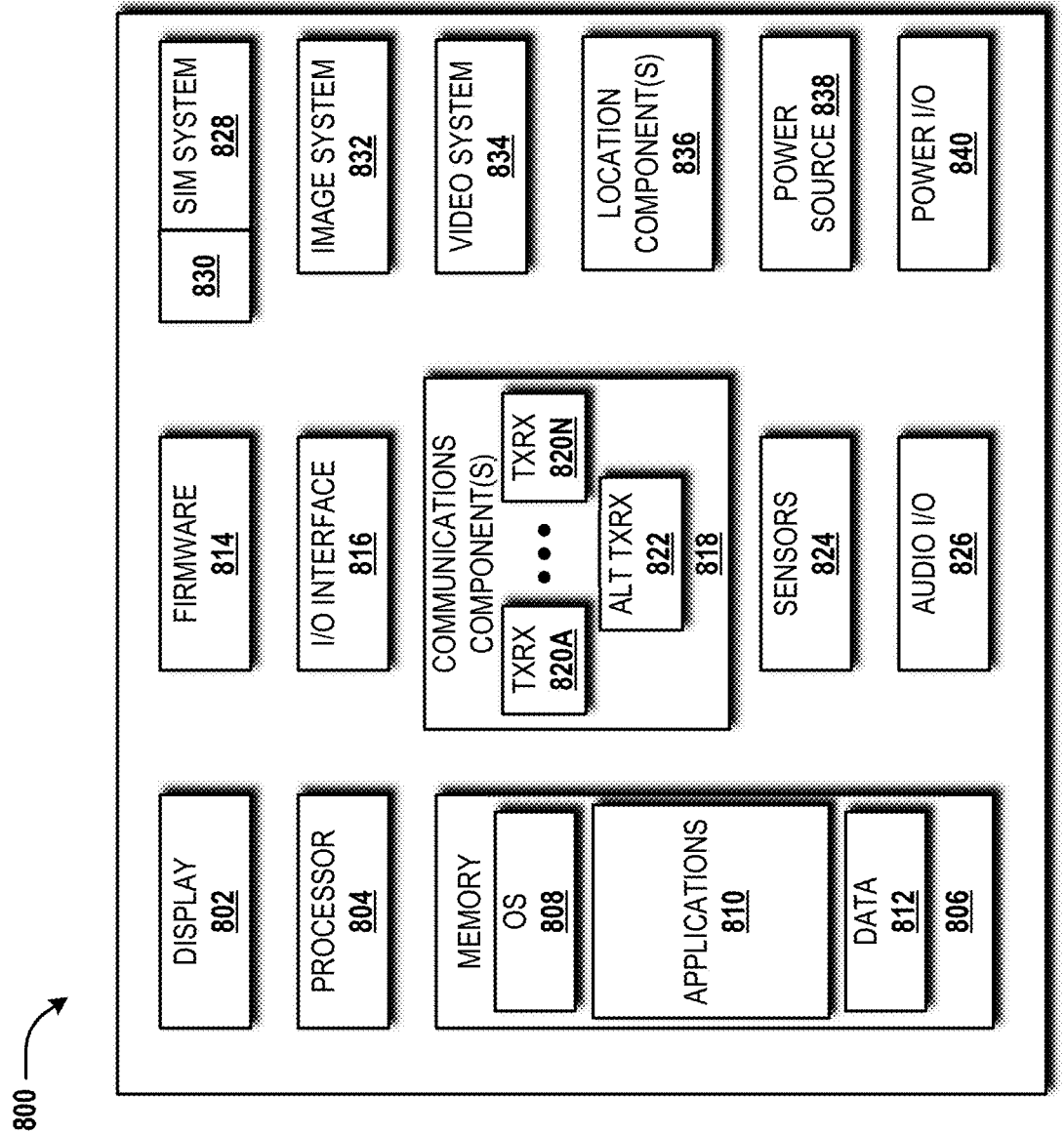
FIG. 8 is a block diagram illustrating an example mobile device, according to some illustrative embodiments.

Turning now to FIG. 8, an illustrative mobile device 800 and components thereof will be described. In some embodiments, the CPE 112 described above with reference to FIG. 1 can be configured as and/or can have an architecture similar or identical to the mobile device 800 described herein with respect to FIG. 8. It should be understood, however, that the CPE 112 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display any information. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in the memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in answering/initiating calls, entering/deleting other data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800.

According to various embodiments, the applications 810 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It should be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/ multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more of the networks described herein. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. One or more of the sensors 824 can be used to detect movement of the mobile device 800. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a location of the mobile device 800. According to various embodiments, the location components 836 can send and/or receive signals from GPS devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that aspects of dynamic CE for G.Fast have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    measuring, by a fast access to subscriber terminal ("G.Fast") distribution point unit ("DPU") comprising a DPU processing component, an upstream signal attenuation of a G.Fast cable in a G.Fast circuit to obtain an upstream signal attenuation value;
    determining, by the G.Fast DPU, a new cyclic extension value based upon the upstream signal attenuation value;
    determining, by the G.Fast DPU, if the new cyclic extension value is not equal to a default cyclic extension value; and
    in response to determining that the new cyclic extension value is not equal to the default cyclic extension value, updating, by the G.Fast DPU, a cyclic extension value for the G.Fast cable in the G.Fast circuit to the new cyclic extension value.

2. The method of claim 1, further comprising synchronizing a G.Fast modem with the default cyclic extension value.

3. The method of claim 1, wherein measuring, by the G.Fast DPU, the upstream signal attenuation of the G.Fast cable in the G.Fast circuit to obtain the upstream signal attenuation value comprises measuring, by the G.Fast DPU, the upstream signal attenuation of the G.Fast cable in the G.Fast circuit to obtain the upstream signal attenuation value in accordance with a standard.

4. The method of claim 1, wherein determining, by the G.Fast DPU, the new cyclic extension value based upon the upstream signal attenuation value comprises determining, by the G.Fast DPU, the new cyclic extension value based upon the upstream signal attenuation value, at least in part, by using a cross-reference table to determine the new cyclic extension value that cross references the upstream signal attenuation value.

5. The method of claim 1, wherein, in response to determining that the new cyclic extension value is equal to the default cyclic extension value, applying, by the G.Fast DPU, the default cyclic extension value.

6. The method of claim 1, wherein, in response to determining that the new cyclic extension value is not equal to the default cyclic extension value, applying, by the G.Fast DPU, the new cyclic extension value.

7. A fast access to subscriber terminal ("G.Fast") distribution point unit ("DPU") system comprising:
   a DPU processing component; and
   a DPU memory having instructions stored thereon that, when executed by the DPU processing component, cause the DPU processing component to perform operations comprising
      measuring an upstream signal attenuation of a G.Fast cable in a G.Fast circuit to obtain an upstream signal attenuation value,
      determining a new cyclic extension value based upon the upstream signal attenuation value,
      determining if the new cyclic extension value is not equal to a default cyclic extension value, and
      in response to determining that the new cyclic extension value is not equal to the default cyclic extension value, updating a cyclic extension value for the G.Fast cable in the G.Fast circuit to the new cyclic extension value.

8. The G.Fast DPU system of claim 7, wherein the operations further comprise synchronizing a G.Fast modem with the default cyclic extension value.

9. The G.Fast DPU system of claim 7, wherein measuring the upstream signal attenuation of the G.Fast cable in the G.Fast circuit to obtain the upstream signal attenuation value comprises measuring the upstream signal attenuation of the G.Fast cable in the G.Fast circuit to obtain the upstream signal attenuation value in accordance with a standard.

10. The G.Fast DPU system of claim 7, wherein determining the new cyclic extension value based upon the upstream signal attenuation value comprises using a cross-reference table to determine the new cyclic extension value that cross references the upstream signal attenuation value.

11. The G.Fast DPU system of claim 7, wherein, in response to determining that the new cyclic extension value is equal to the default cyclic extension value, applying the default cyclic extension value.

12. The G.Fast DPU system of claim 7, wherein, in response to determining that the new cyclic extension value is not equal to the default cyclic extension value, applying the new cyclic extension value.

13. The G.Fast DPU system of claim 7, wherein the DPU processing component and the DPU memory are implemented in a G.Fast distribution point unit.

14. The G.Fast DPU system of claim 7, wherein the DPU processing component and the DPU memory are implemented in a software-defined network controller.

15. A non-transitory computer-readable storage medium having computer-executable instructions stored thereon that, when executed by a fast access to subscriber terminal ("G.Fast") distribution point unit ("DPU") processing component, cause the G.Fast DPU processing component to perform operations comprising:
   measuring an upstream signal attenuation of a G.Fast cable in a G.Fast circuit to obtain an upstream signal attenuation value;
   determining a new cyclic extension value based upon the upstream signal attenuation value;
   determining if the new cyclic extension value is not equal to a default cyclic extension value; and
   in response to determining that the new cyclic extension value is not equal to the default cyclic extension value, updating a cyclic extension value for the G.Fast cable in the G.Fast circuit to the new cyclic extension value.

16. The non-transitory computer-readable storage medium of claim 15, wherein the operations further comprise synchronizing a G.Fast modem with the default cyclic extension value.

17. The non-transitory computer-readable storage medium of claim 15, wherein measuring the upstream signal attenuation of the G.Fast cable in the G.Fast circuit to obtain the upstream signal attenuation value comprises measuring the upstream signal attenuation of the G.Fast cable in the G.Fast circuit to obtain the upstream signal attenuation value in accordance with a standard.

18. The non-transitory computer-readable storage medium of claim 15, wherein determining the new cyclic extension value based upon the upstream signal attenuation value comprises determining the new cyclic extension value based upon the upstream signal attenuation value, at least in part, by using a cross-reference table to determine the new cyclic extension value that cross references the upstream signal attenuation value.

19. The non-transitory computer-readable storage medium of claim 15, wherein, in response to determining that the new cyclic extension value is equal to the default cyclic extension value, applying the default cyclic extension value.

20. The non-transitory computer-readable storage medium of claim 15, wherein, in response to determining that the new cyclic extension value is not equal to the default cyclic extension value, applying the new cyclic extension value.

* * * * *